US009345360B2

(12) United States Patent (10) Patent No.: US 9,345,360 B2
Sims (45) Date of Patent: May 24, 2016

(54) METHOD OF MAKING INFANT FORMULA AND RELATED DEVICES

(71) Applicant: Brian Sims, Trussville, AL (US)

(72) Inventor: Brian Sims, Trussville, AL (US)

(*) Notice: Subject to any disclaimer, the term of this patent is extended or adjusted under 35 U.S.C. 154(b) by 442 days.

(21) Appl. No.: 13/788,630

(22) Filed: Mar. 7, 2013

(65) Prior Publication Data

US 2013/0291737 A1 Nov. 7, 2013

Related U.S. Application Data

(60) Provisional application No. 61/642,956, filed on May 4, 2012.

(51) Int. Cl.
| | |
|---|---|
| *A47J 31/047* | (2006.01) |
| *A47J 31/06* | (2006.01) |
| *A47J 31/40* | (2006.01) |
| *B65D 85/804* | (2006.01) |

(52) U.S. Cl.
CPC .............. *A47J 31/407* (2013.01); *A47J 31/047* (2013.01); *B65D 85/8043* (2013.01)

(58) Field of Classification Search
CPC ....... A47J 31/047; A47J 31/401; A47J 31/56; A47J 31/52; A47J 31/057; A47J 31/54; A47J 31/02; A47J 31/0573; A47J 31/053; A47J 31/007; A47J 31/0576; B65D 85/8043; A23L 3/365; A01K 63/065; A23C 3/031; F24H 1/202; F24H 9/2021; H05B 3/78
USPC ............... 99/281, 295, 323.3, 283, 280, 483, 99/304–315; 392/442, 444–451
See application file for complete search history.

(56) References Cited

U.S. PATENT DOCUMENTS

| | | | | |
|---|---|---|---|---|
| 5,116,632 | A * | 5/1992 | Miller | A47J 31/40 426/435 |
| 5,480,661 | A | 1/1996 | Ellis et al. | |
| 5,570,816 | A | 11/1996 | LaBarbera, Jr. | |
| 6,142,063 | A * | 11/2000 | Beaulieu et al. | 99/283 |
| 6,411,777 | B2 * | 6/2002 | Roberson | 392/442 |
| 6,606,938 | B2 * | 8/2003 | Taylor | 99/295 |
| 6,766,106 | B2 * | 7/2004 | Roberson | 392/442 |
| 6,797,293 | B2 | 9/2004 | Shin et al. | |
| 7,104,184 | B2 | 9/2006 | Biderman et al. | |
| 7,165,488 | B2 * | 1/2007 | Bragg et al. | 99/295 |
| 7,316,249 | B2 | 1/2008 | Cheong | |
| 8,007,847 | B2 | 8/2011 | Biderman et al. | |
| 8,127,662 | B2 | 3/2012 | Nijboer et al. | |
| 8,210,099 | B2 | 7/2012 | Kang | |
| 8,261,656 | B2 | 9/2012 | Nijboer et al. | |
| 8,261,944 | B2 | 9/2012 | Krause et al. | |
| 8,360,279 | B1 * | 1/2013 | Giles | 222/145.6 |
| 2008/0050480 | A1 * | 2/2008 | Doglioni Majer | 426/231 |
| 2009/0293733 | A1 * | 12/2009 | Martin et al. | 99/280 |
| 2010/0239734 | A1 | 9/2010 | Yoakim et al. | |
| 2010/0263543 | A1 * | 10/2010 | Krauchi et al. | 99/280 |
| 2013/0019756 | A1 * | 1/2013 | Coats | A47J 31/04 99/281 |

* cited by examiner

*Primary Examiner* — Dana Ross
*Assistant Examiner* — Hemant Mathew
(74) *Attorney, Agent, or Firm* — P.A. Smith, LLC

(57) ABSTRACT

Embodiments described herein may comprise an infant formula cartridge for preparing infant formula from premeasured quantities of dry or concentrated liquid components. Other embodiments may include a device for preparing infant formula from said cartridge including means for customizing the infant formula preparation to suit specific health issues.

8 Claims, 17 Drawing Sheets

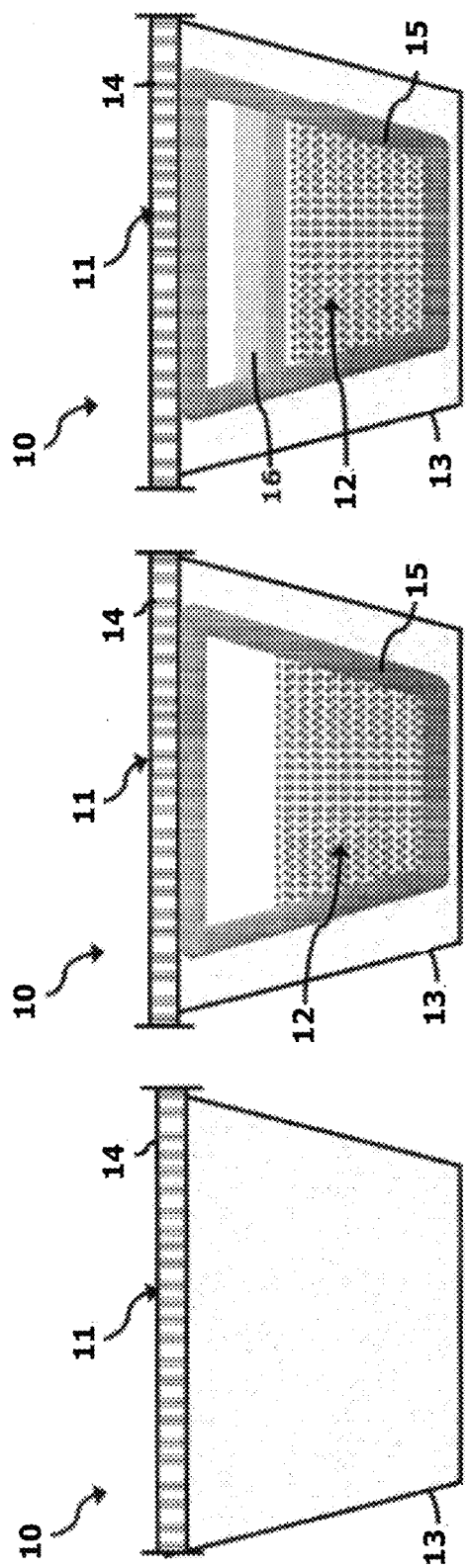

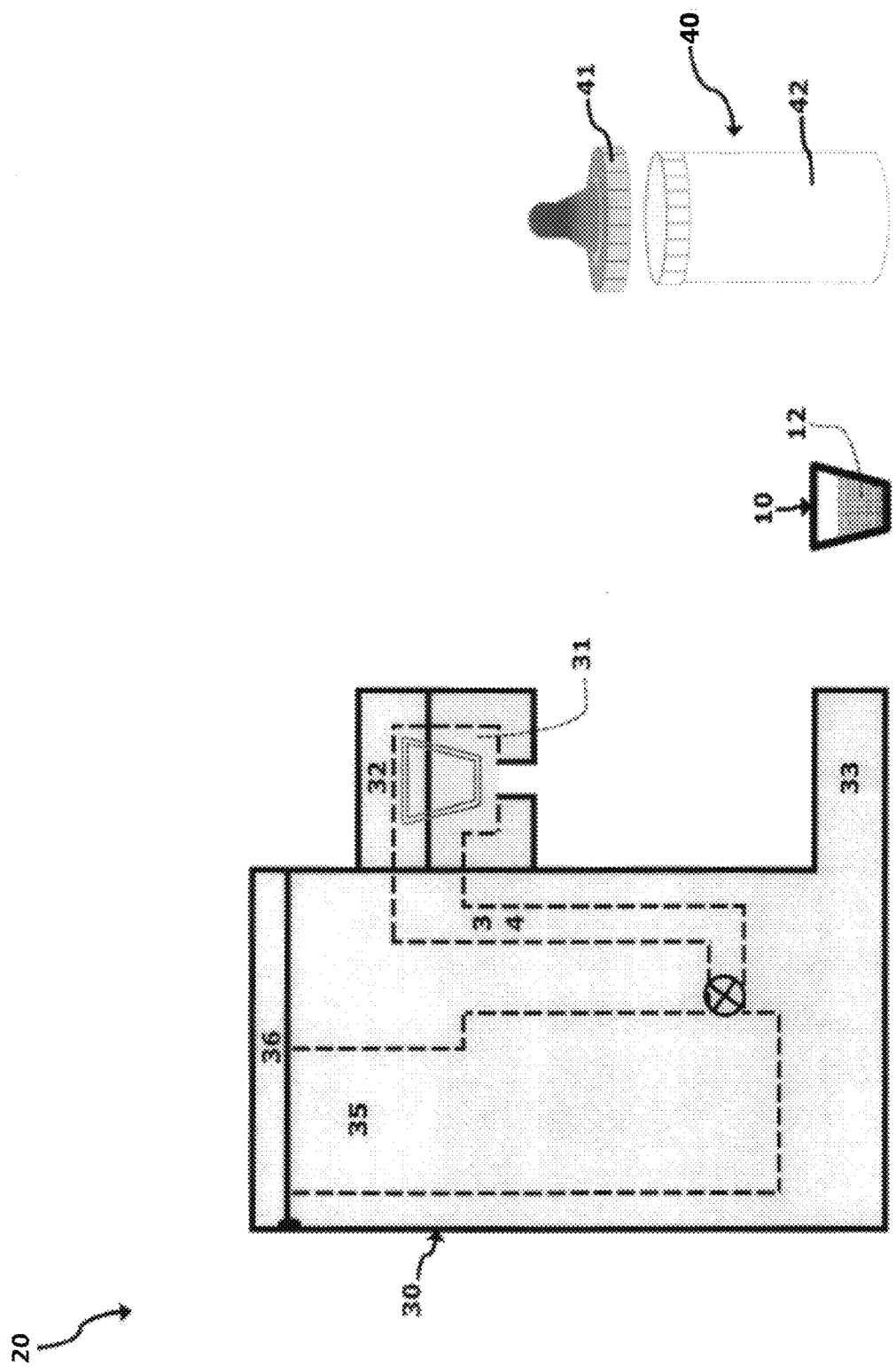

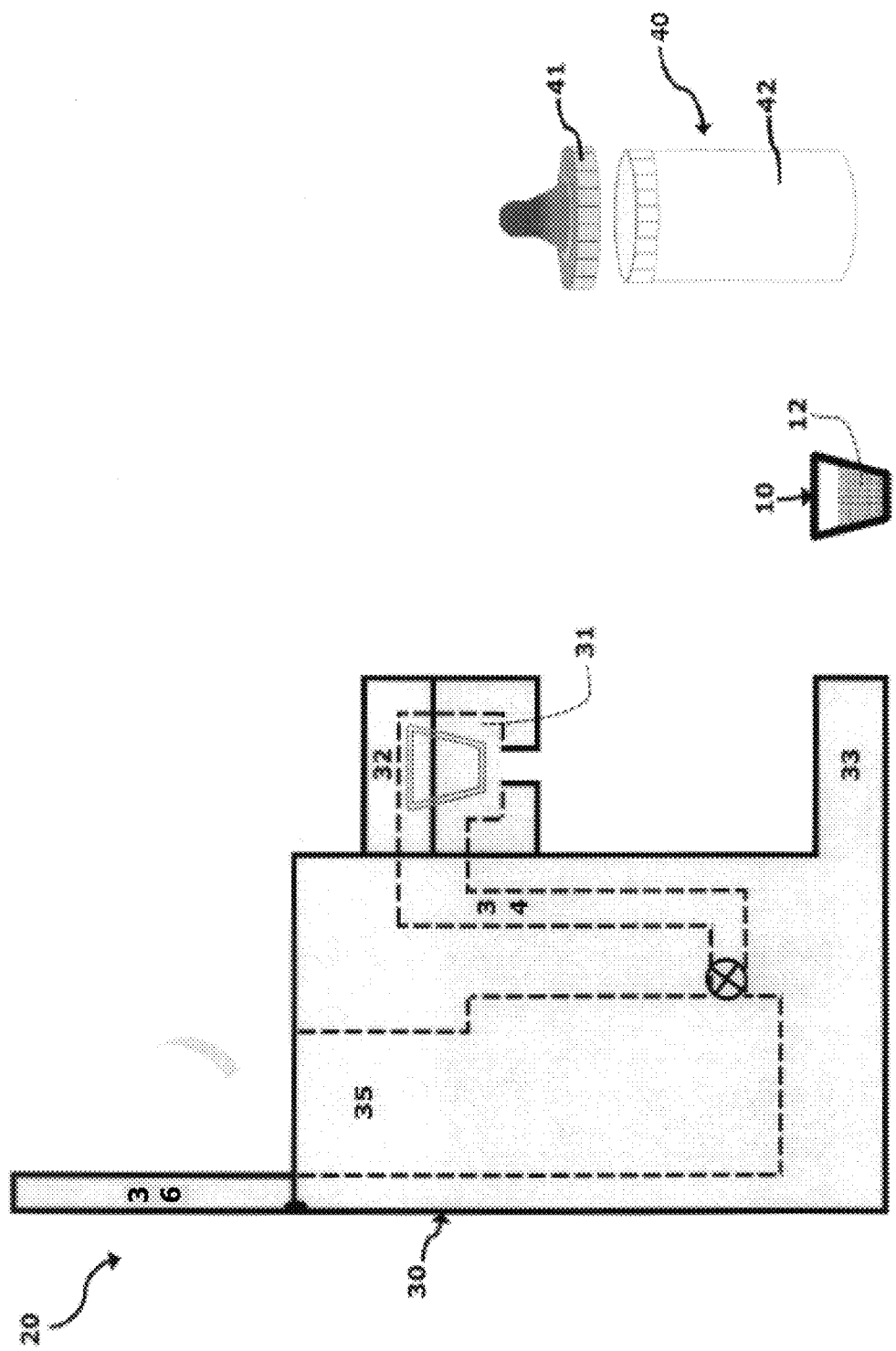

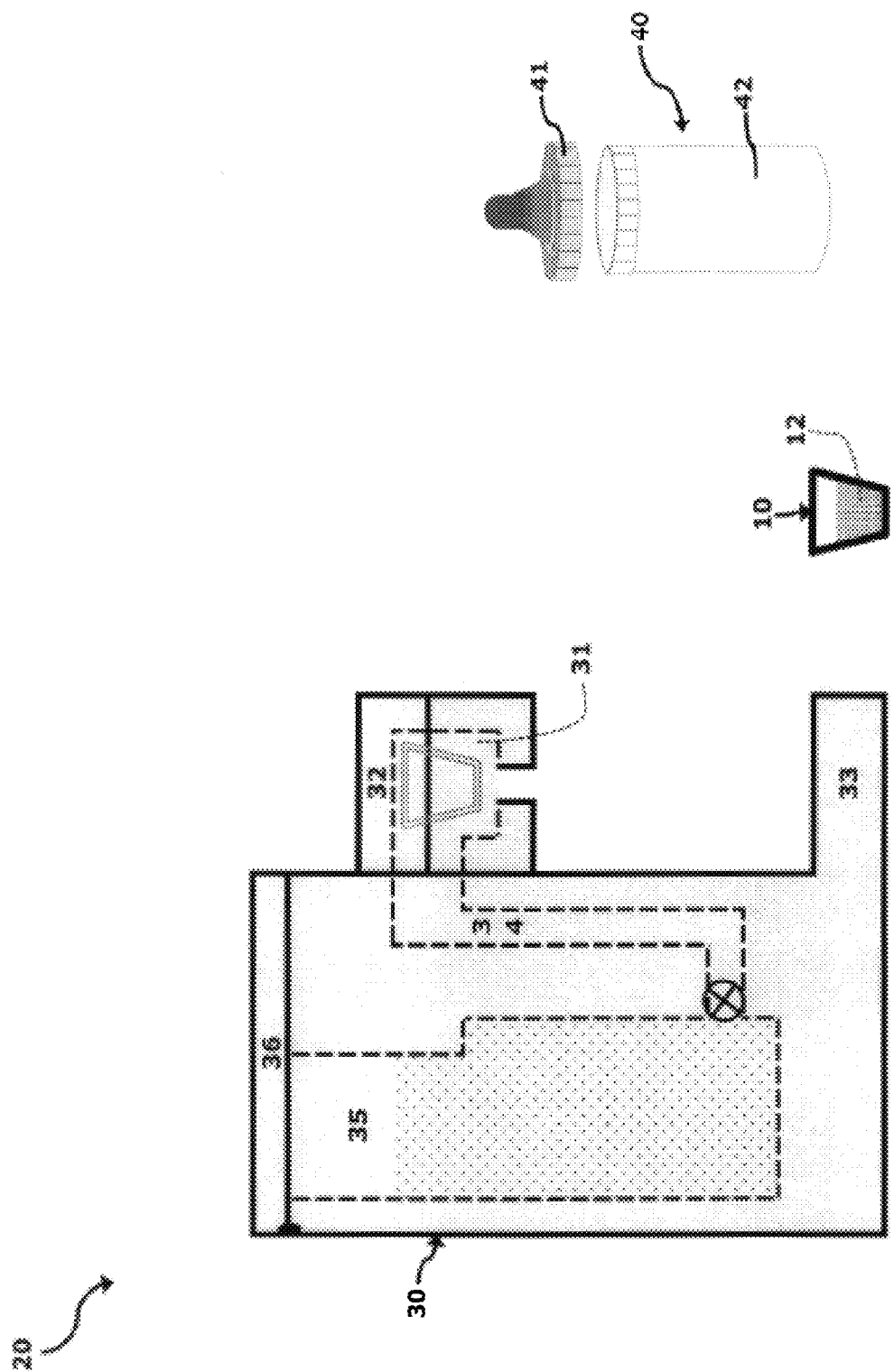

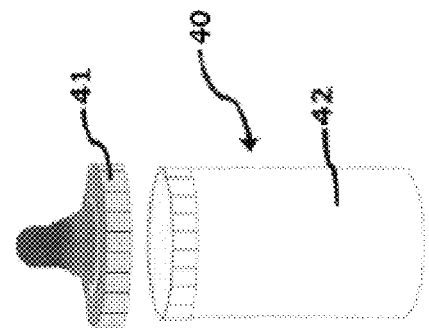
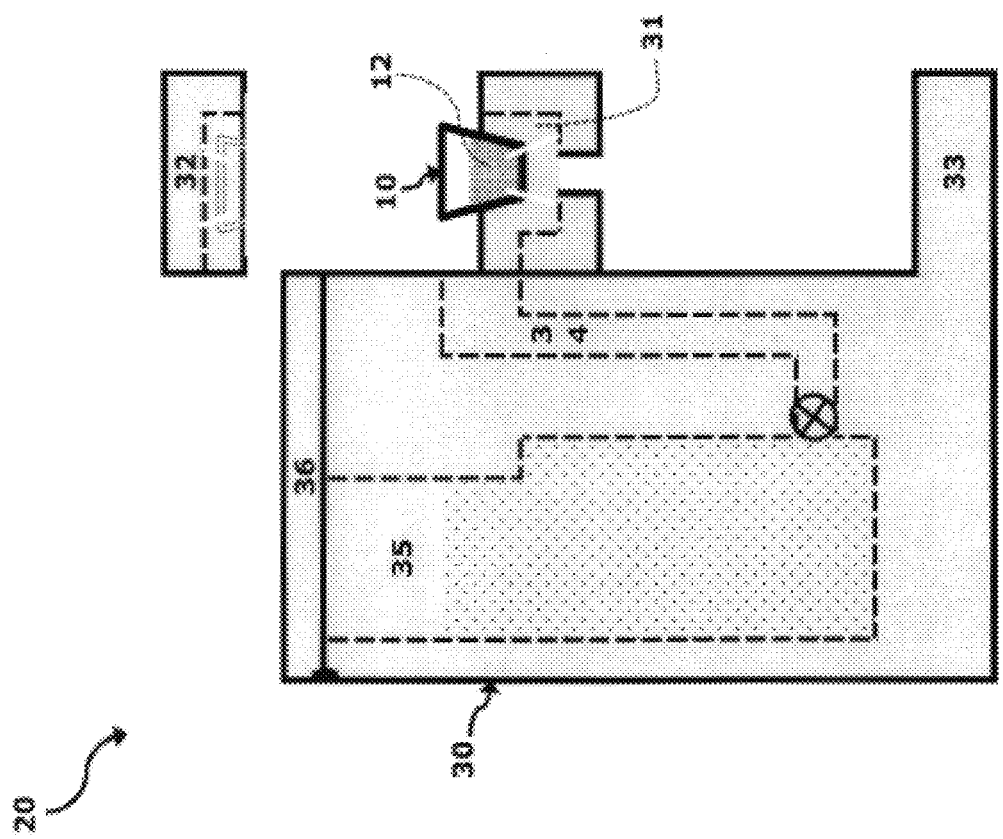
FIGURE 2F

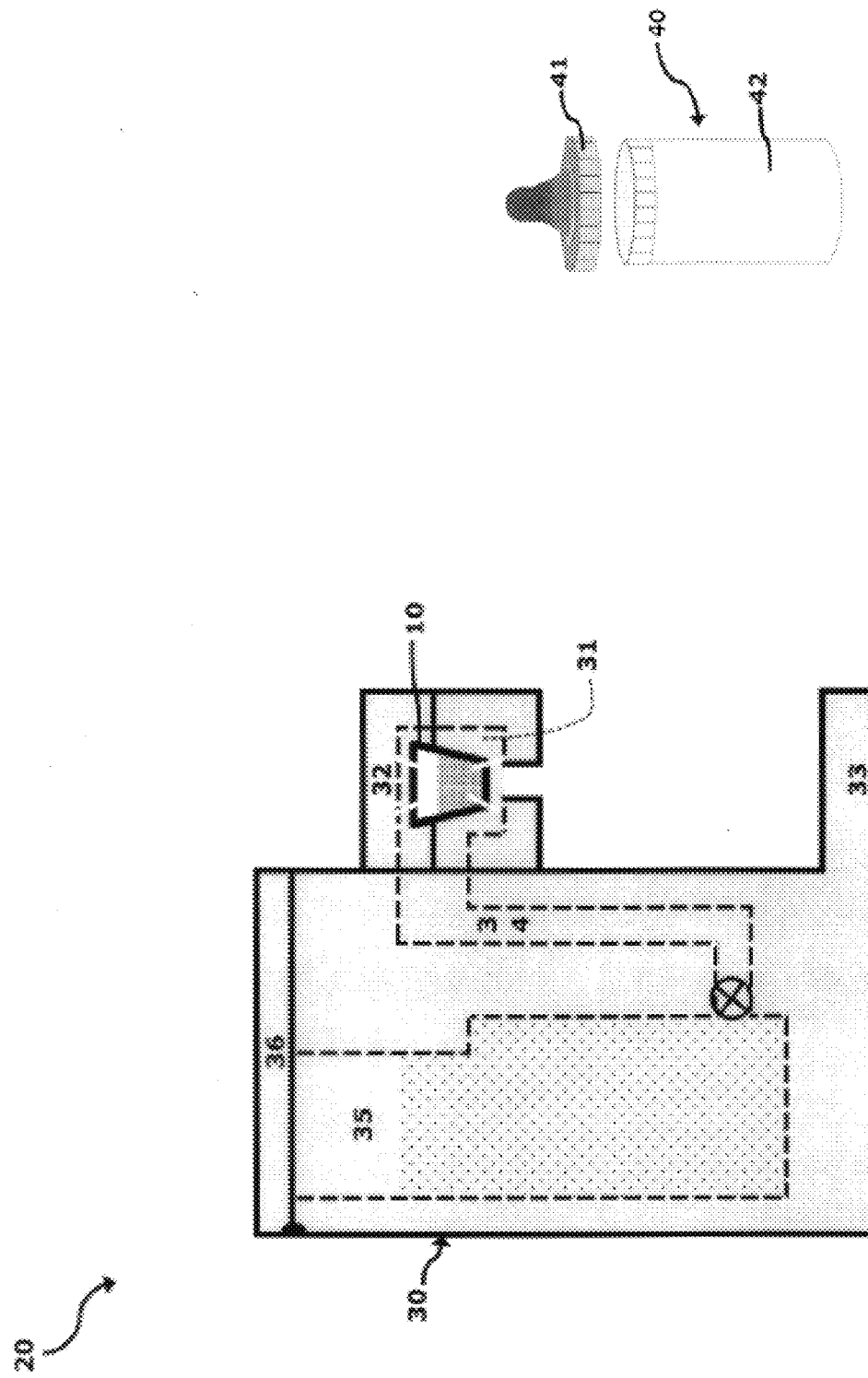

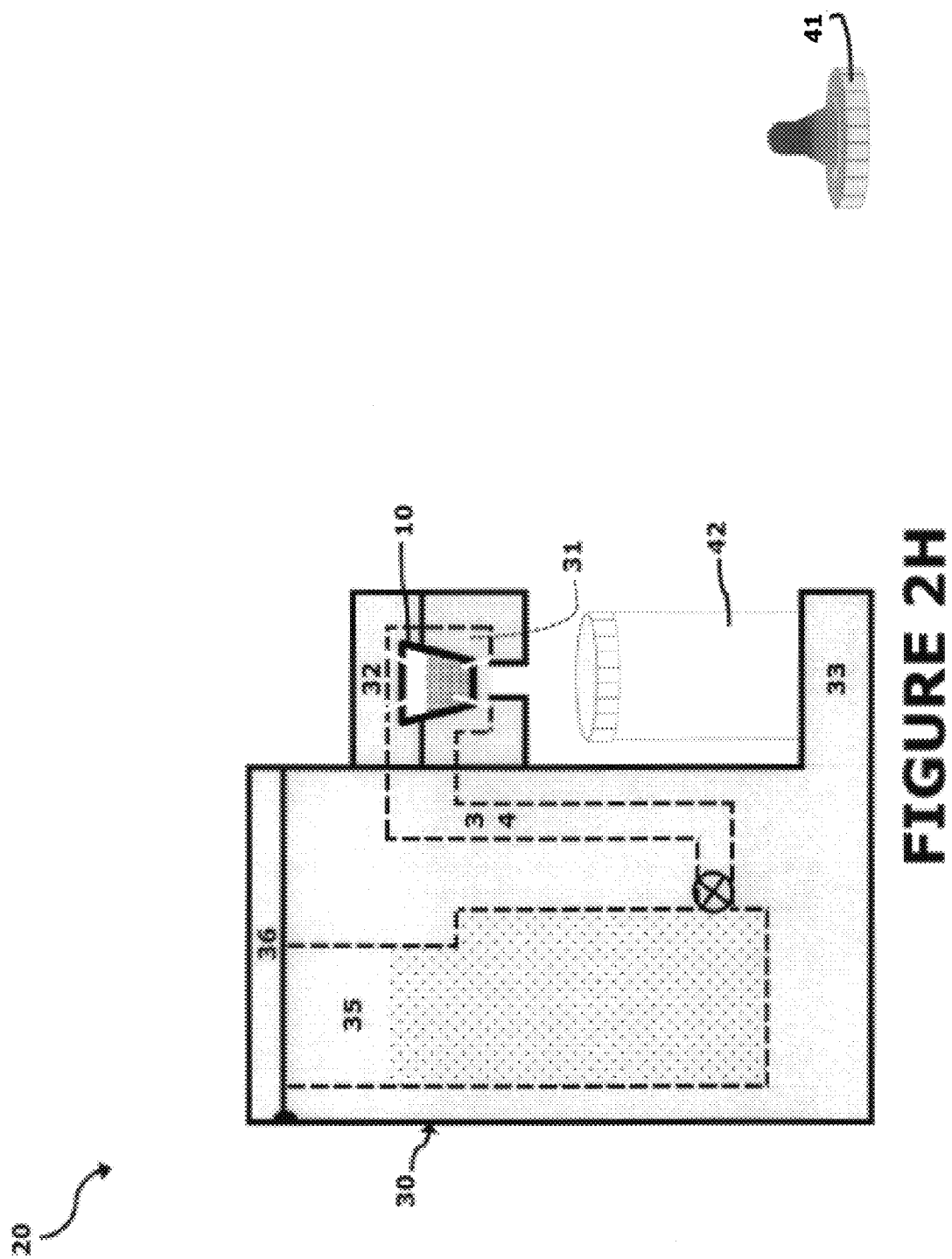

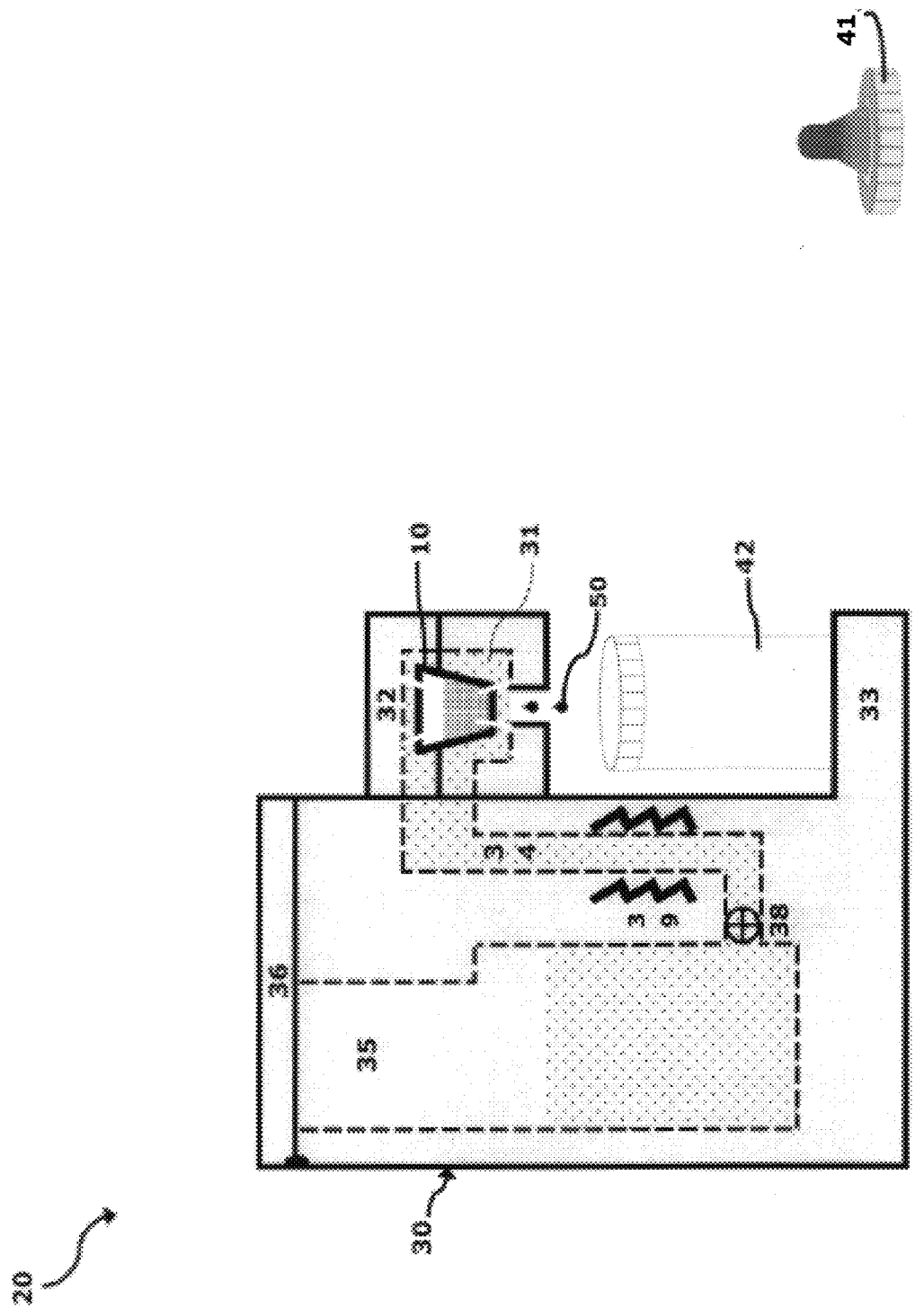

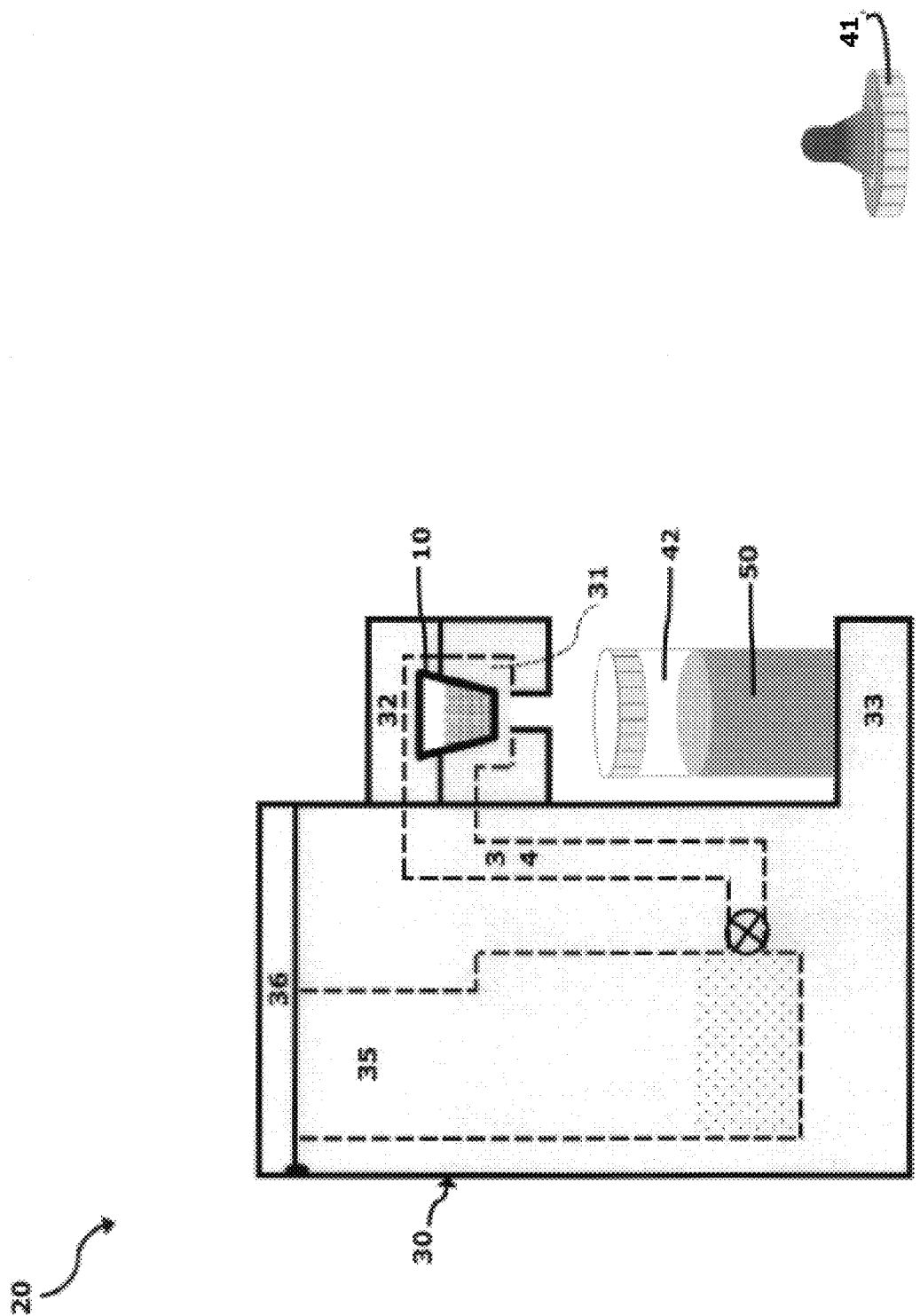

METHOD OF MAKING INFANT FORMULA AND RELATED DEVICES

I. CROSS REFERENCE TO RELATED APPLICATION

This application claims the benefit of U.S. Provisional Patent Application No. 61/642,956 filed on May 4, 2012, which is incorporated herein by reference in its entirety.

II. BACKGROUND OF THE INVENTION

A. Field of Invention

Some embodiments of the present invention may generally relate to infant formula preparation.

B. Description of the Related Art

Infant formula is often used as a substitute for mother's milk during the first year or so of a baby's life. Accordingly, the objective of most infant formulas is to closely duplicate the nutritional content of mother's milk and this usually works well for a full term healthy baby. With a premature or health-challenged baby, the infant formula may need to be modified to accelerate growth and/or incorporate condition-specific supplements. In any case, parents understandably prefer that formula preparation be as convenient and stress-free as possible.

What is needed is a convenient means for preparing infant formula. Some embodiments of the present invention may provide one or more benefits or advantages over the prior art.

III. SUMMARY OF THE INVENTION

An infant-formula-making system is provided which borrows familiar steps from a popular coffee-making process to reduce the stress of baby feeding times.

Some embodiments may relate to an infant formula preparation system, comprising: a water source adapted to supply water to the system; a water line in fluid communication with the water source and adapted to convey water along a predetermined path; a water metering means in fluid communication with the water line and adapted to receive water from the water line, and dispense a metered amount of water through an output of the water metering means; a computer-controlled heater in thermal communication with the water line and adapted to maintain a volume of water within the water line at a predetermined temperature; a water output line in fluid communication with the output of the water metering means, the water output line being adapted to pierce an infant formula cartridge and deliver temperature-controlled water thereto; at least one structural element adapted to receive the infant formula cartridge in a supported relation; and an effluent line in a fixed mechanical relation with the at least one structural element and adapted to pierce a bottom surface of the cartridge and allow dissolved or diluted infant formula to exit the cartridge.

According to some embodiments the water source comprises one or more of a reservoir or a household plumbing water source.

According to some embodiments the water metering means comprises a device selected from one or more of a metering valve or a pump.

According to some embodiments the pump is selected from one or more of a piston pump, a syringe pump, a peristaltic pump, or a diaphragm pump.

Some embodiments may include a computer processor in electronic controlling communication with the computer controlled heater, and the water metering means, wherein the computer processor is in electronic communication with a user interface adapted to supply instructions to the computer processor according to user selections.

Some embodiments may include a data port in electronic data communication with the computer processor and adapted to download data into the system and store the data in an onboard rewritable storage medium.

Some embodiments may include comprising at least one auxiliary reservoir in metered fluid communication with the water output line.

According to some embodiments metered fluid communication between the at least one auxiliary reservoir and the water output line is achieved using a device comprising one or more of a piston pump, a syringe pump, a peristaltic pump, or a diaphragm pump.

Some embodiments may relate to an infant formula cartridge, comprising: a base portion defining a vessel adapted to be received in a seated relation in a concentrate introduction chamber; a cover portion sealably joined to an opening of the base portion, the base portion and the cover portion cooperating to define an inner containment space; and an inner casing disposed within the inner containment space of the base portion and containing powdered infant formula concentrate, wherein an interior of the inner casing is in fluid communication with an exterior of the inner casing.

According to some embodiments the powdered infant formula comprises an additive selected from one or more of whey protein, casein, soy protein, fat, linoleic acid, vitamin A, vitamin C, vitamin D, vitamin E, vitamin K, vitamin B1 (thiamin), B2 (riboflavin), B6, B12, niacin, folic acid, pantothenic acid, calcium, mineral nutrients, magnesium, iron, zinc, manganese, copper, phosphorus, iodine, sodium chloride, potassium chloride, carbohydrates, nucleotides, biotin, choline, inositol, a medicament, or any combination thereof.

Some embodiments may relate to an infant formula preparation system, comprising: a concentrate introduction chamber adapted to receive an infant formula cartridge in a seated relation; at least one water input line terminating inside the concentrate introduction chamber and positioned so as to puncture a top of the infant formula cartridge, wherein an opposing end of the water input line is in fluid communication with a water source; a fluid control member disposed upstream from the end of the water input line terminating inside the concentrate introduction chamber, and disposed downstream from the water source, the fluid control member being selected from one or more of a valve or a pump; a temperature control means adapted to control the temperature of a volume of water upstream from the fluid control member, and further adapted to prevent the fluid control member from actuating when the volume of water is outside of a predetermined range; at least one effluent line terminating inside the concentrate introduction chamber and positioned so as to puncture a bottom of the infant formula cartridge, wherein an opposing end of the effluent line is adapted to communicate with an external receptacle for receiving prepared infant formula; and a volume controlling means for delivering a predetermined volume of heated water to the concentrate introduction chamber, wherein the delivered volume of heated water may be determined by a user.

Some embodiments may include a component for delivering metered amounts of one or more of a nutritional supplement, a nutrient, or a medicament to the infant formula cartridge.

According to some embodiments the component for delivering metered amounts comprises one or more of a piston pump, a syringe pump, a peristaltic pump, or a diaphragm pump.

According to some embodiments the component for delivering metered amounts is in electronic controlling communication with a computer processor adapted to control the operation of the component for delivering metered amounts according to one or more preprogrammed protocols.

According to some embodiments the processor is in electronic data communication with at least one rewritable storage medium adapted to contain the one or more preprogrammed protocols.

According to some embodiments the at least one rewritable storage medium is in data communication with one or more data input components adapted to communicate the one the one or more preprogrammed protocols to the rewritable storage medium, the one or more data input components being selected from one or more of an onboard key pad, an onboard touch screen, a USB port, or an Ethernet port.

According to some embodiments the system is adapted to deliver metered amounts of one or more of whey protein, casein, soy protein, fat, linoleic acid, vitamin A, vitamin C, vitamin D, vitamin E, vitamin K, vitamin B1 (thiamin), B2 (riboflavin), B6, B12, niacin, folic acid, pantothenic acid, calcium, mineral nutrients, magnesium, iron, zinc, manganese, copper, phosphorus, iodine, sodium chloride, potassium chloride, carbohydrates, nucleotides, biotin, choline, inositol, a medicament, or any combination or liquid solution thereof.

According to some embodiments the volume controlling mean comprises one or more of a piston pump, a syringe pump, a peristaltic pump, or a diaphragm pump.

According to some embodiments the volume controlling means is in electronic controlling communication with a computer processor adapted to control the operation of the volume controlling means according to one or more preprogrammed protocols.

According to some embodiments the processor is in electronic data communication with at least one rewritable storage medium adapted to contain the one or more preprogrammed protocols, and wherein the at least one rewritable storage medium is in data communication with one or more data input components adapted to communicate the one the one or more preprogrammed protocols to the rewritable storage medium, the one or more data input components being selected from one or more of an onboard key pad, an onboard touch screen, a USB port, or an Ethernet port.

Other benefits and advantages will become apparent to those skilled in the art to which it pertains upon reading and understanding of the following detailed specification.

IV. BRIEF DESCRIPTION OF THE DRAWINGS

The invention may take physical form in certain parts and arrangement of parts, embodiments of which will be described in detail in this specification and illustrated in the accompanying drawings which form a part hereof and wherein:

FIG. 1A is a front view showing the overall structure of a cartridge according to an embodiment;

FIG. 1B is a front cross sectional view of a cartridge according to an embodiment;

FIG. 1C is a front cross sectional view of a cartridge according to an embodiment;

FIG. 2A is a side cross sectional view of a system according to an embodiment;

FIG. 2B is a side cross sectional view of a system according to an embodiment;

FIG. 2D is a side cross sectional view of a system according to an embodiment;

FIG. 2F is a side cross sectional view of a system according to an embodiment showing a cartridge being inserted;

FIG. 2G is a side cross sectional view of a system according to an embodiment showing water input and effluent lines piercing a cartridge;

FIG. 2H is a side cross sectional view of a system according to an embodiment showing an infant formula receptacle in position to receive formula;

FIG. 2I is a side cross sectional view of a system according to an embodiment showing a heating feature;

FIG. 2J is a side cross sectional view of a system according to an embodiment after delivering infant formula;

V. DETAILED DESCRIPTION OF THE INVENTION

Figure 2C:
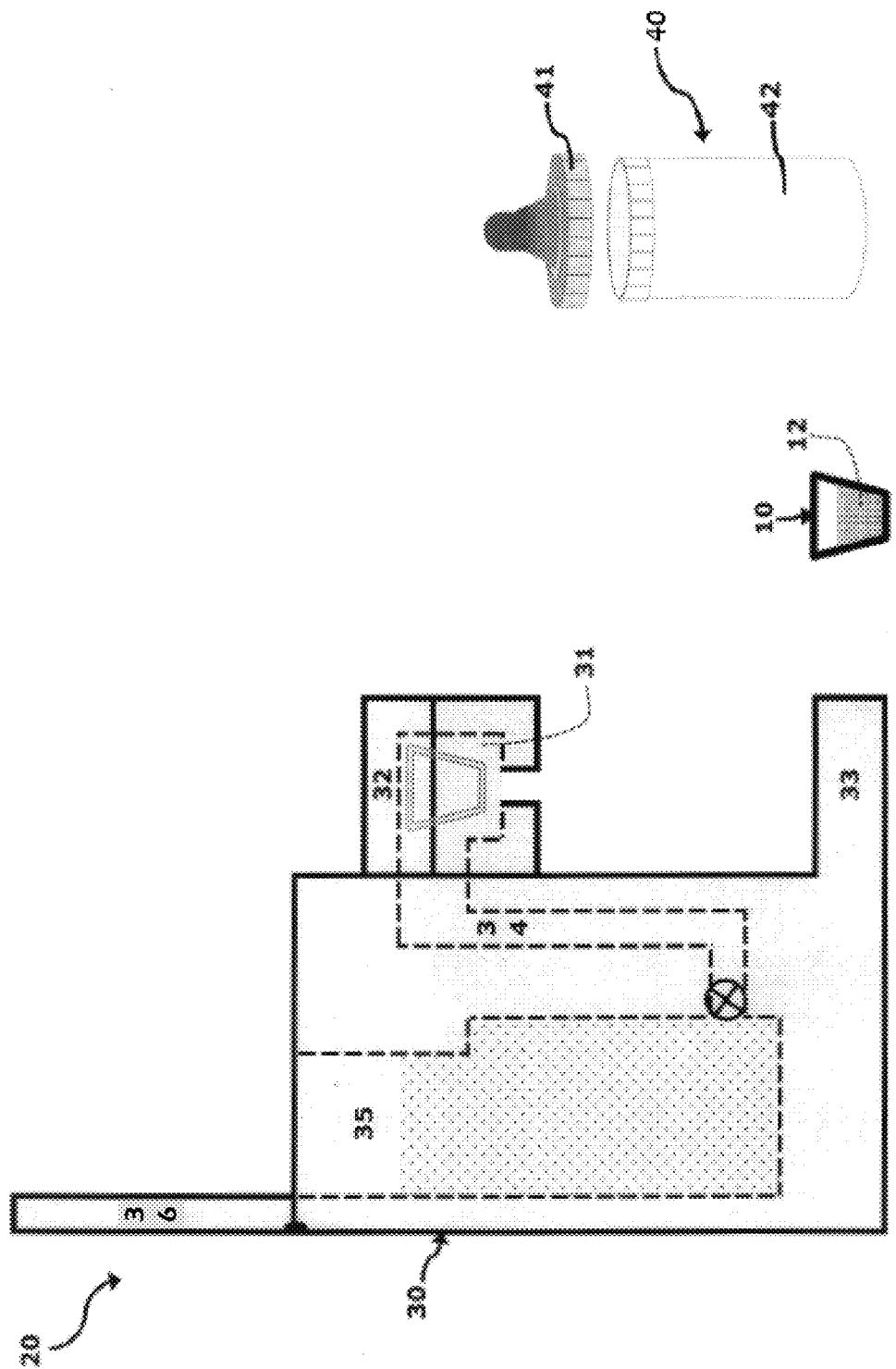
FIG. 2C is a side cross sectional view of a system according to an embodiment.

Referring now to the drawings wherein the showings are for purposes of illustrating embodiments of the invention only and not for purposes of limiting the same, FIGS. 1A-1C, illustrate a cartridge 10 which comprises a container 11 and an infant-formula concentrate 12 sealed within the container 11.

A container 11 may comprise a base portion 13 having a top opening and cover portion 14 sealing this opening. The base portion 13 may be made of relatively rigid material, such as thermoformed polymeric material, and the cover portion 14 may be made of more flexible material, such as a metal foil, a polymer film, or a combination or laminate thereof. Both portions 13/14 may cooperate to define an inner containment space where infant formula concentrate may be disposed, and the base portion 13 and the cover portion 14 may cooperate to seal out moisture and ambient atmospheres. Furthermore, both portions 13/14 may be imperforate, but yieldably pierceable, such that one or more devices described herein may pierce the portions 13/14 thus enabling liquid, such as water, to be delivered to the cartridge 10 and drained therefrom along with dissolved contents of the cartridge 10.

The infant-formula concentrate 12 can comprise protein, fat, linoleic acid, vitamin A, vitamin C, vitamin D, vitamin E, vitamin K, vitamin $B_1$ (thiamin), $B_2$ (riboflavin), $B_6$, $B_{12}$, niacin, folic acid, pantothenic acid, carbohydrates, nucleotides, mineral nutrients, calcium, magnesium, iron, zinc, manganese, copper, phosphorus, iodine, sodium chloride, potassium chloride. The infant-formula concentrate 12 can comprise, for example and without limitation, cow's milk whey and casein as a protein source, one or more vegetable oils as a fat source, and/or lactose as a carbohydrate source. Soybean-derived protein may instead be used in place of cow's milk as a protein source, with the addition of biotin, choline and inositol.

The infant-formula concentrate 12 may be in powdered form manufactured using a dry blending process, a wet mixing process, and/or a spray drying process. For example, a base powder consisting mainly of protein and fat components may be produced with wet mixing and spray drying processes, and then this base powder dry blended with carbohydrate, mineral and vitamin ingredients. A liquid and/or other non-powdered concentrate 12 of infant formula could be used instead.

According to some embodiments, the concentrate 12 may be carried and/or sealed within a casing 15 also situated inside the container 11. The casing 15 can be permeable and/or perforated, and may participate in other cartridge functions, such as filtering, straining, or seeping.

The concentrate 12 may be formulated so that, when properly mixed with an appropriate amount of water (e.g., four to eight ounces), it produces a liquid simulating human milk for consumption by healthy full term baby. Alternatively, the concentrate 12 may instead be formulated to provide a more concentrated product which may be desirable to accelerate growth in preterm and/or low birth weight babies. Additionally or alternatively, medicinal and/or nutritional supplements 16 may be integrated into the cartridge 10, these supplements being specific to a condition of the consuming infant.

Referring now to FIG. 2, a system 20 for preparing a single serving (e.g., bottle) of infant formula is shown. An infant-formula-making system 20 according to FIG. 2 may comprise a cartridge 10 and a dispensing machine 30 having a concentrate-introduction chamber 31. The cartridge container 11 is adapted for insertion into the concentrate-introduction chamber 31. The concentrate-introduction chamber 31 may be accessible via an openable-closeable housing arrangement. For example, in the illustrated embodiment, a removable cap 32 is shown. A deck 33 may be disposed beneath the chamber 31 and one or more heated water lines 34 may communicate with the chamber 31. A reservoir 35, with a lifting top 36, can be provided for water storage. The cartridge container 11 is adapted for insertion into the concentrate-introduction chamber 31 and the infant-formula concentrate 12 is adapted to be extracted therefrom when in this chamber 31.

As shown in FIGS. 2A through 2D, to make a single serving of infant formula which a baby may drink from a baby bottle 40, the top 36 of the dispensing machine 30 can be opened and water can be poured into the reservoir 35. The top 36 may then be closed. Alternatively, water may be plumbed directly into the dispensing machine 30, thus removing the need for a filling step, and potentially removing the need for a reservoir 35 entirely.

Figure 2E:
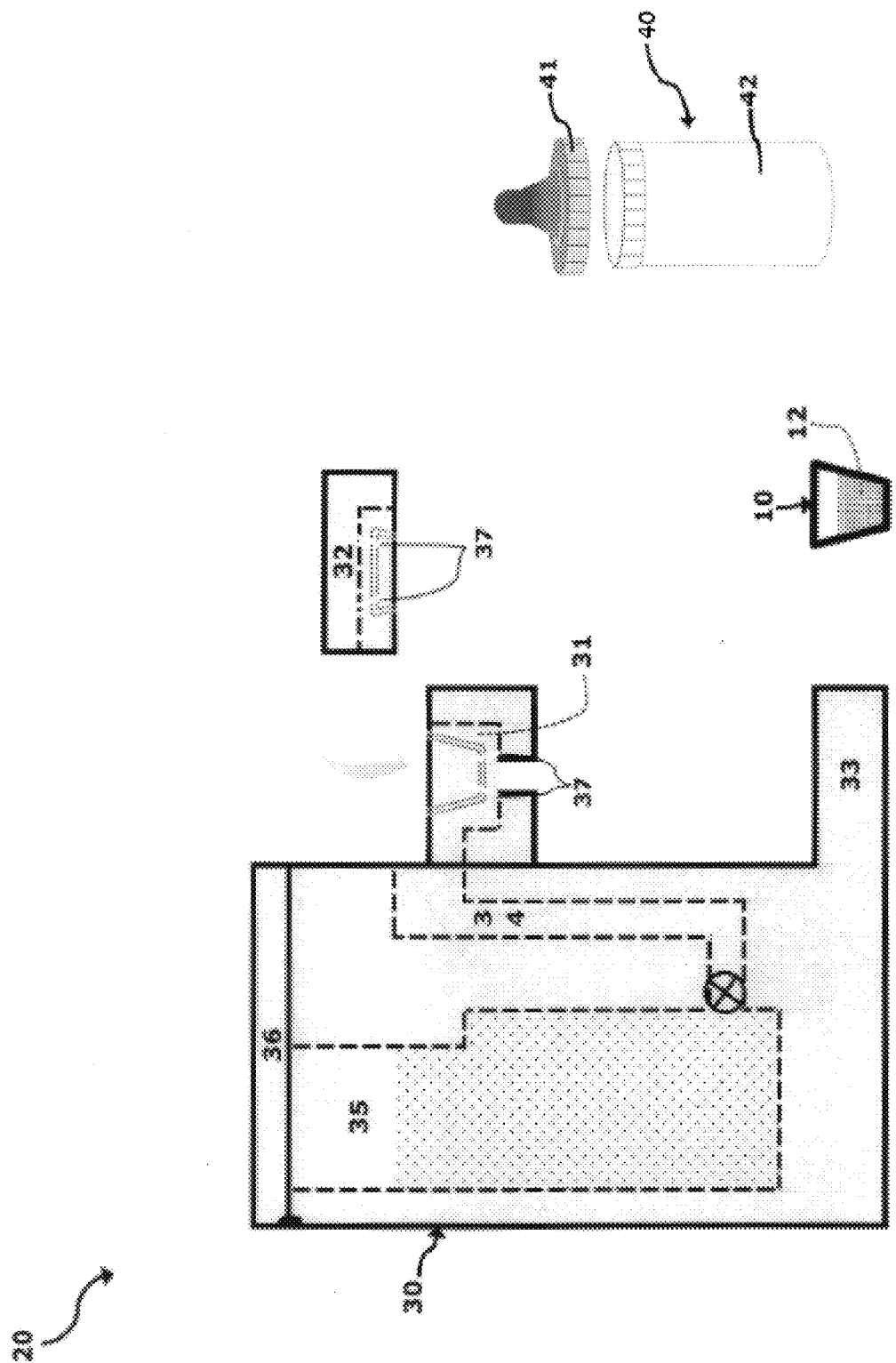
FIG. 2E is a side cross sectional view of a system according to an embodiment showing a concentrate-introduction chamber cover removed.
Figure 2K:
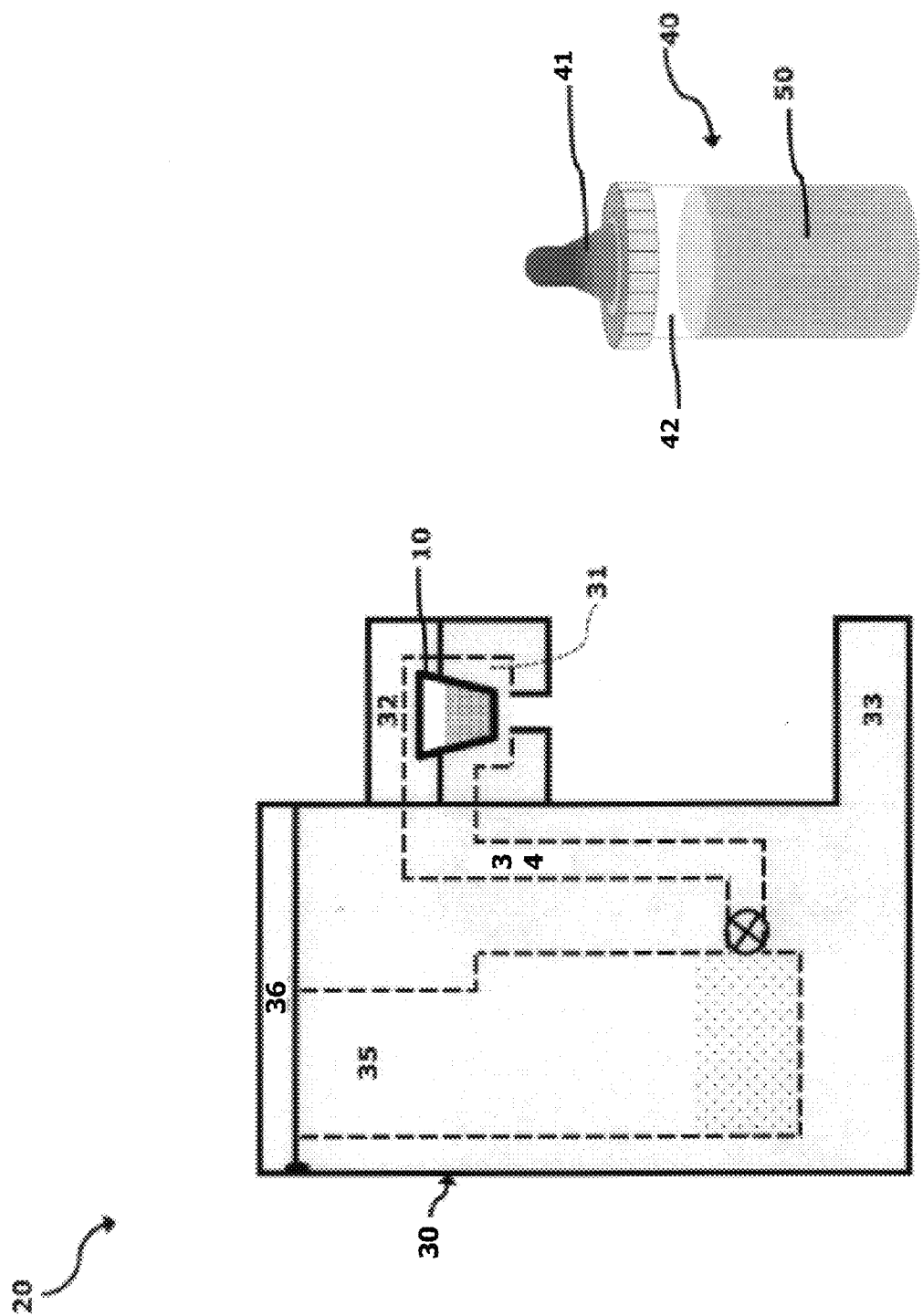
FIG. 2K is a side cross sectional view of a system according to an embodiment showing a filled feeding bottle.

As shown in FIGS. 2E through 2G, the concentrate-introduction chamber 31 may be opened, a fresh cartridge 10 may be inserted therein, and the chamber 31 may then be closed. According to the embodiment illustrated in these figures, opening and closing can be accomplished, for example, by removing and then replacing the removable cap 32. At some point during or after the cartridge-insertion steps, the container 11 may be perforated so that water may flow therethrough. Such perforation may be accomplished, for example, by pins 37 which poke through the container 11 when the cartridge 10 is placed in the chamber 31 and/or upon return of the cap 32. In some embodiments, the pins 37 may comprise fluid lines for draining formula from the container 11. Similarly, some embodiments may include one or more input fluid lines which may be used to puncture a top of a cartridge and deliver temperature-controlled water thereto.

The bottle 42 (of the baby bottle 40) may then be placed on the deck 33 and water may be communicated through water input line 34 by, for example, a pump 38. The water's temperature can be increased, if necessary, by heaters 39. When the water reaches the cartridge 10 at an end of the water input line 34 terminating in the chamber 31, it mixes with the concentrate 12 to produce infant formula 50. The formula 50 is dispensed into the bottle 42, which can then be coupled to a nipple lid 41, and fed to a baby. (FIGS. 2H-2K.)

Figure 3A:
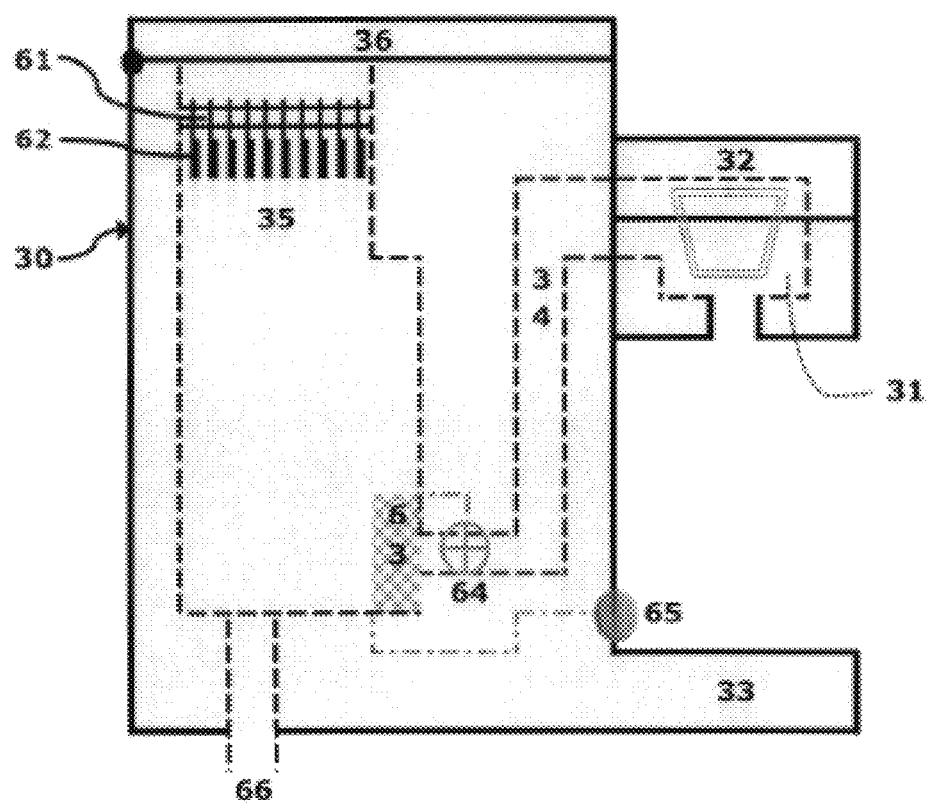
FIG. 3A is a side cross sectional view of a system according to an embodiment showing water purity components.
Figure 3B:
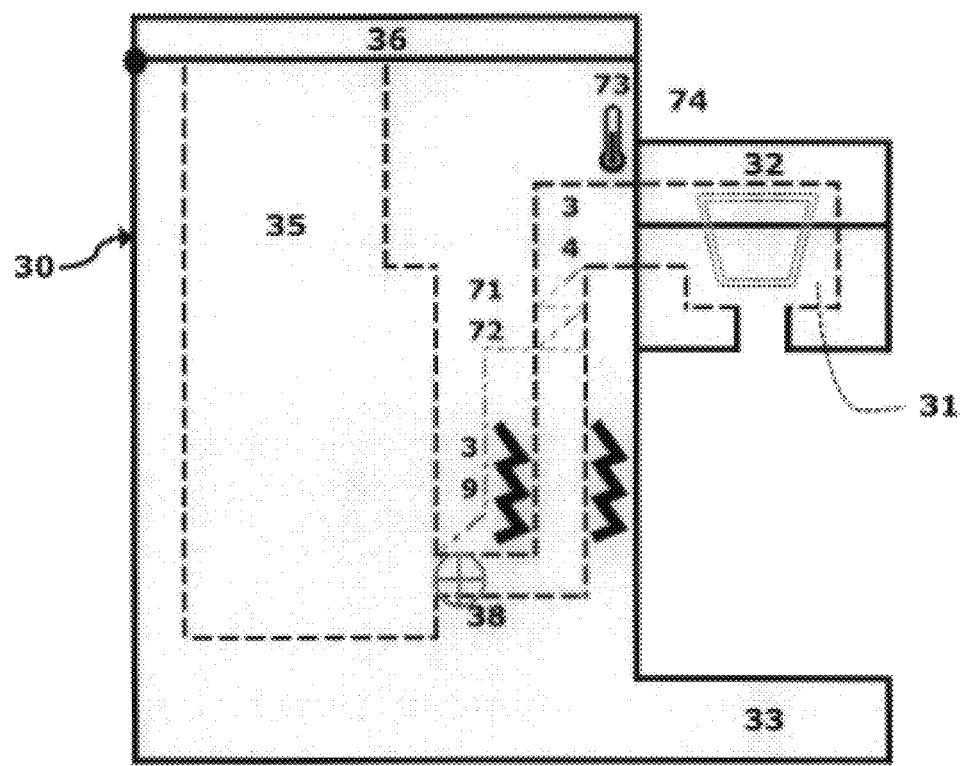
FIG. 3B is a side cross sectional view of a system according to an embodiment.

In some respects an embodiment can resemble a conventional single-serve coffee machine. However, some alterations, such as is shown in FIGS. 3A-3B, can make such a machine more suitable for this infant-formula application. As will be explained further herein, suitable devices may also include means for adjusting the volume of water delivered to a cartridge, controlling and/or limiting water temperature for safety, and delivering metered amounts of selected additives, nutrients, supplements, and/or medicaments.

For example, as shown in FIG. 3A, the machine 30 may include components for removing water contaminants which may have a deleterious effect on infants. In one embodiment a pair of filters 61, 62 can be installed at the inlet to the reservoir 36. Suitable filters may include activated carbon, charcoal, nonwoven fiber mats, or other means for removing chemical and biological contaminants which are known in the art. Embodiments may include a water-purity sensor 63, as are known in the art, which may be installed at an outlet of the reservoir. The sensor 63 may be operably connected to a valve 64 and/or pump 38 and may allow the valve 64 and/or pump 38 to deliver water only when the sensor 63 detects a sufficient level of water purity. Additionally or alternatively, the sensor 63 can be operably connected to a visual or audio alarm 65 which is adapted to communicate an alarm state when the sensor 63 detects a fault condition such as insufficient water purity. On a more general level, the reservoir 35 can be sized to discourage stagnation. For example, the reservoir may be sized to contain only enough water to produce a single serving of formula, e.g. 4 ounces, 8 ounces, or 10 ounces. Embodiments may optionally include a drain 66 for periodic reservoir purges.

As shown in FIG. 3B, temperature-control components can be incorporated into the machine 30 to insure that the water is at an appropriate temperature, e.g. from about 92° F. to 100° F. Embodiments may also include redundant thermostats 71-72 which may shut off the pump 38, valve 64, and/or the heaters 39 in the event that water temperature reaches a predetermined upper limit. A pre-chamber water temperature sensor 73 may be included and may display water temperature on a display panel 74 such as a commonly available liquid crystal display.

Figure 4A:
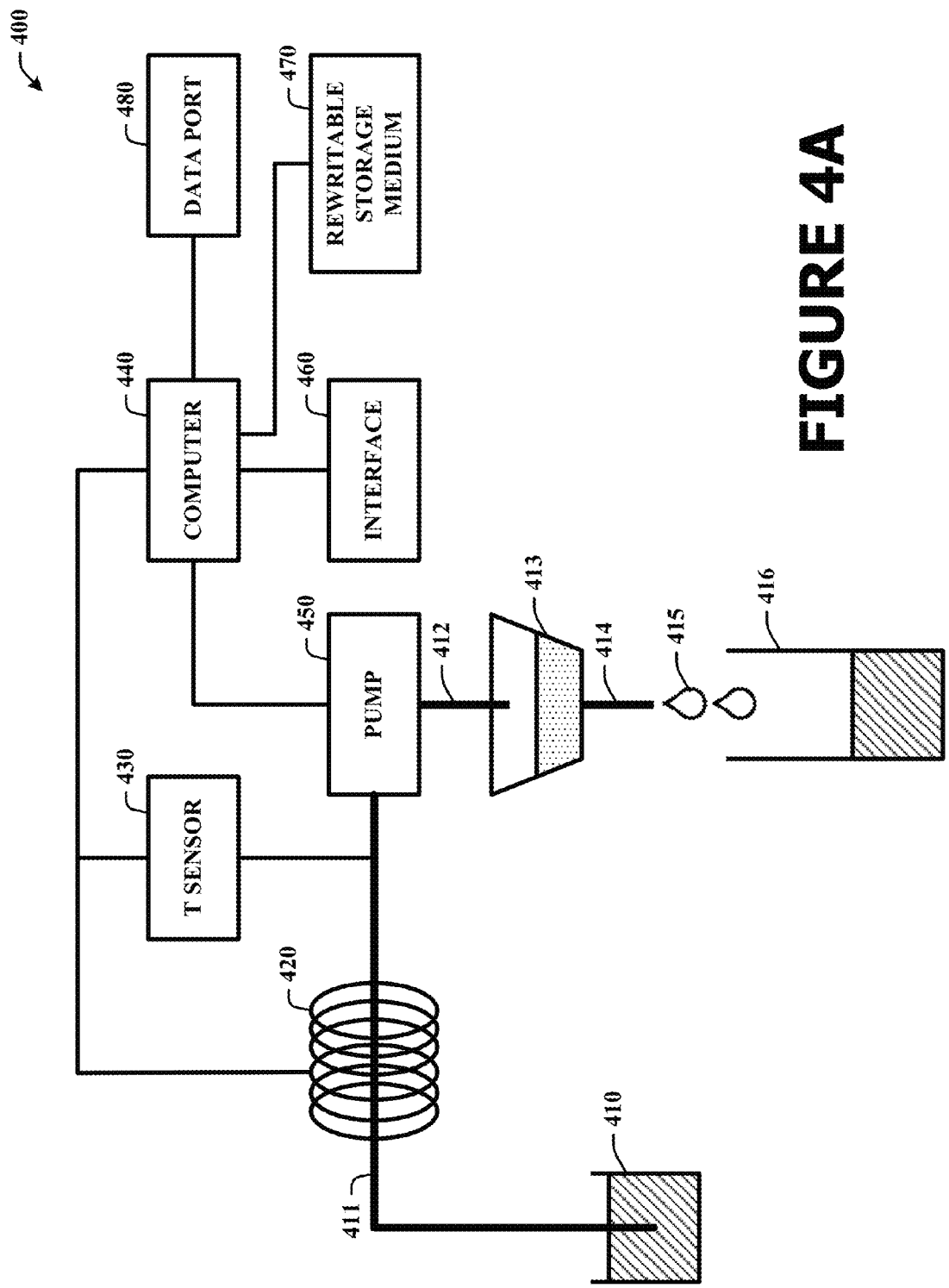
FIG. 4A is a schematic representation of an embodiment including temperature controlling components.

FIG. 4A illustrates an infant formula making system 400 which includes a reservoir 410 containing a liquid such as water. A pump 450 draws water through a water line 411 from the reservoir 410. One skilled in the art will appreciate that a variety of volume metering means may be appropriate depending on factors including the degree of accuracy and precision require, speed requirements, and spatial and cost requirements. Examples of appropriate means include piston pumps, syringe pumps, peristaltic pumps, and/or diaphragm pumps. However, in some embodiments water may be metered with sufficient accuracy using a less accurate positive displacement pump. Furthermore, one skilled in the art will appreciate that some embodiments may include plumbing adapted to receive water from a household plumbing water source, and therefore may not require a pump at all relying instead on the pressure of the household source to drive water through the system. In embodiments which lack a reservoir a means for metering the water delivered to a cartridge may comprise a metering valve rather than a pump.

Further according to FIG. 4A, the water line 411 is in thermal communication with one or more temperature controlling members such as a heating coil 420 or other suitable heating element. The heating coil is in electronic controlling communication with a computer 440 which is adapted to energize and de-energize the heating coil 420 in response to data received from a temperature sensor 430, which is in thermal communication with a volume of water in the water line 411. For instance, the computer 440 may be programmed with a protocol which maintains the volume of water in the water line 411 at a set point of 100° F. with a maximum of 110° F. and a minimum of 90° F. Accordingly, the computer 440 may apply a proportional-integral-differential algorithm to control water temperature using these hardware elements. Furthermore, the pump 450 is also in electronic controlling communication with the computer 440.

Therefore, the computer 440 may not allow the pump 450 to be energized unless the volume of water in the water line 411 is within an acceptable predetermined temperature range. According to one embodiment, when a user instructs the system 400 to produce infant formula 415, the system 400 may first poll the temperature sensor 430 to determine whether the water is within the predetermined acceptable range. If the water is too cool, then the system 400 may energize the heating coil 420 for a predetermined time, voltage, and/or current, and may periodically poll the temperature sensor 430 to determine whether additional heating is required or if the temperature upper limit has been exceeded. Alternatively or additionally, temperature control components including heating elements and/or temperature sensors may be disposed in thermal communication with the reservoir 410 rather than (or in addition to) the water line 411.

Once the computer 440 determines that an acceptable water temperature has been reached, the computer 440 may instruct the pump 450 to meter out a predetermined volume of water. According to FIG. 4A, the water would pass through a water line 412 to a cartridge 413 which contains concentrated infant formula. As shown, the water line 412 actually pierces a lid or top cover of the cartridge 413. An effluent line 414 is shown piercing a bottom of the cartridge 413 allowing the dissolved or diluted infant formula 415 to flow from the cartridge 413 to a receptacle 416 such as a feeding bottle. While not specifically shown, one skilled in the art will appreciate that a system 400 includes structural elements for receiving a cartridge 413 in a supported relation so that the cartridge 413 can be held in place while it is being pierced and otherwise used by the system 400 to make infant formula 415. Such structural element may also support the effluent line 414 in a fixed mechanical relation so that the effluent line 414 can resist the force required pierce the cartridge 413.

Cartridges 413 according to some embodiments may include powdered formula, or liquid concentrate formula. Furthermore, such cartridges 413 may include infant formula compositions which are adapted to treat certain predetermined health conditions which an infant may experience such as low birth weight, anemia, nutritional deficiencies, bacterial infections, or other conditions which are typically treated by administering one or more medicaments. Other cartridges 413 according to embodiments of the invention may comprise base formulations to which the infant formula preparation system 400 may add one or more ingredients during preparation. A base formulation may include a formulation according to Table 1.

TABLE 1

FDA Nutrient Specifications for Infant Formulas (per 100 kcal formula):

| Component | Minimum | Maximum |
|---|---|---|
| Biotin (mcg) | 1.5 | — |
| Calcium (mg) | 60 | — |
| Chloride (mg) | 55 | 150 |
| Choline (mg) | 7 | — |
| Copper (mcg) | 60 | — |
| Fat (g) | 3.3 | 6.0 |
| Folic Acid (mcg) | 4 | — |
| Iodine (mcg) | 5 | — |
| Inositol (mg) | 4 | — |
| Iron (mg) | 0.15 | 3.0 |
| Linoleic acid (mg) | 300 | — |
| Magnesium (mg) | 6 | — |
| Manganese (mcg) | 5 | — |
| Niacin (mcg) | 250 | — |
| Pantothenic Acid (mcg) | 300 | — |
| Phosphorous (mg) | 30 | — |
| Potassium (mg) | 80 | 200 |
| Protein (g) | 1.8 | 4.5 |
| Riboflavin (mcg) | 60 | — |
| Sodium (mg) | 20 | 60 |
| Thiamine (mcg) | 40 | — |
| Vitamin A (IU) | 250 | 750 |
| Vitamin B6 (mcg) | 35 | — |
| Vitamin B12 (mcg) | 0.15 | — |
| Vitamin C (mg) | 60 | — |
| Vitamin D (IU) | 40 | — |
| Vitamin E (IU) | 0.7 | — |
| Vitamin K (mcg) | 4 | — |
| Zinc (mg) | 0.5 | — |

Furthermore, the system 400 may include electronic programming means for defining, inputting, recording, downloading, storing, and/or executing ingredient delivery parameters and/or protocols. Such programming means may include a user interface 460 and/or a data port 480. For example, a system 400 may be preprogrammed so that an end user may make selections from a menu driven graphical interface which instruct the system to make a more or less concentrated formula, and/or to add selected ingredients from one or more auxiliary reservoirs. Embodiments which include a data port 480 may allow users to upload formula preparation protocols to the system 400.

Accordingly, a medical doctor may prescribe a particular formulation, and provide a user with a protocol which may be uploaded to the system 400 to produce the prescribed formulation. Such a data port 480 may be a USB (universal serial bus) port, so that protocols may be uploaded from a thumb drive, for instance. However, one skilled in the art will appreciate that a variety of data port types may be appropriate or desirable. For instance, a system 400 may include a USB port in electronic communication with the computer 440 which may be programmed to read a protocol from a thumb drive and store the protocol in rewritable storage medium 470. The protocol may then be accessed by the system 400 which may use the protocol to operate one or more pumps of the system to precisely deliver a prescribed component to a cartridge 413.

Figure 4B:
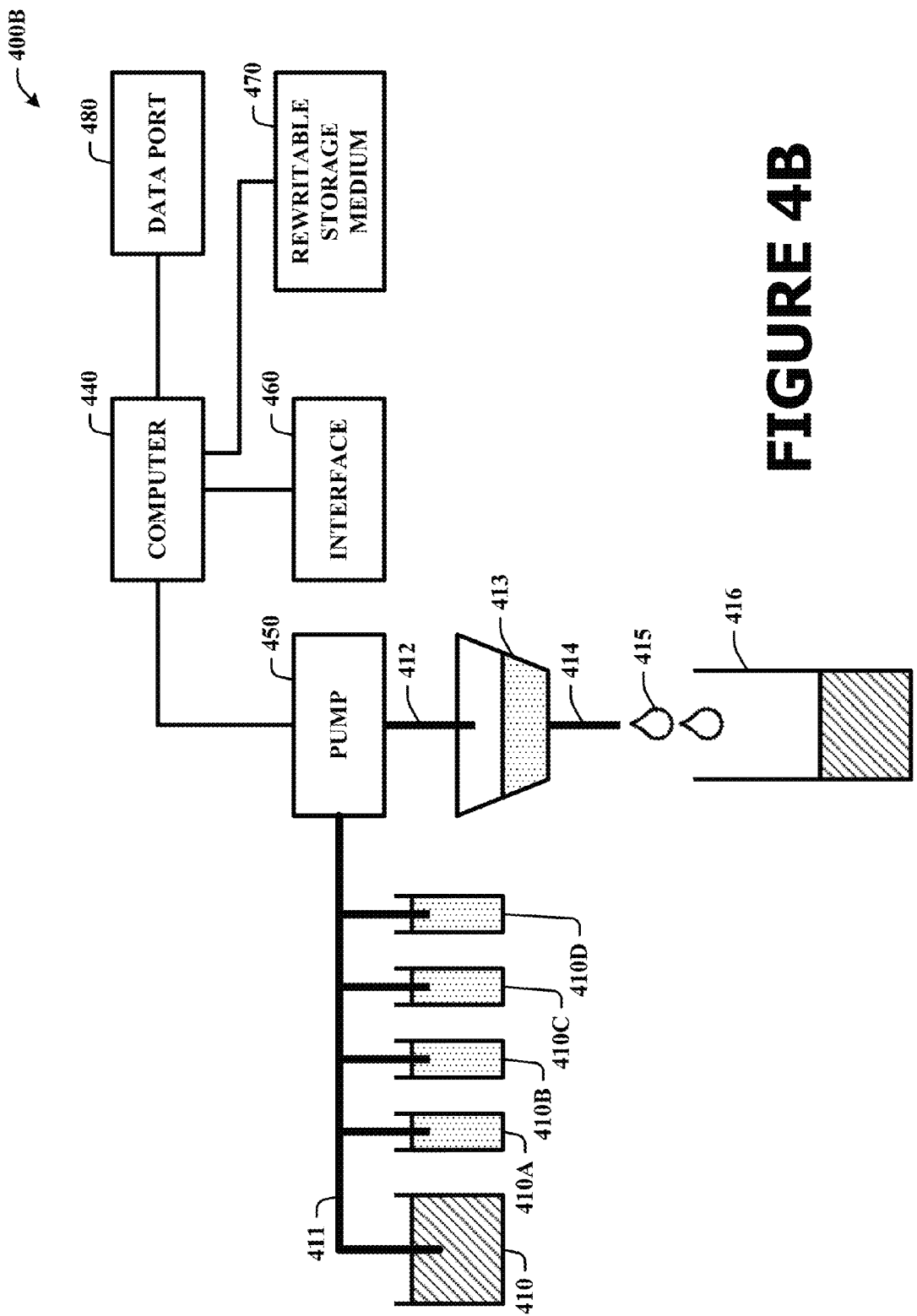
FIG. 4B is a schematic representation of an embodiment showing auxiliary reservoirs.

FIG. 4B illustrates a system 400B, which includes four auxiliary reservoirs (410A, 410B, 410C, and 410D) in addition to the main reservoir 410. While the temperature control components have been omitted, one skilled in the art will appreciate that this is merely for accentuating the auxiliary reservoirs (410A, 410B, 410C, and 410D) and is not meant to suggest that a temperature control means in incompatible with this embodiment. According to the embodiment of FIG. 4B, water is stored in the main reservoir 410, and additives are stored in the auxiliary reservoirs (410A, 410B, 410C, and 410D). The auxiliary reservoirs are shown in fluid communication with pump 450; however, other embodiments may isolate one or more of the reservoirs with one or more dedicated pumps. Furthermore, one skilled in the art will appreciate that a more accurate and precise pump may be required for pumping a small volume of a prescription medicament as compared to the relatively large volume of water required to prepare formula. Thus, at least two different pumping means may be required.

According to some embodiments, the auxiliary reservoirs (410A, 410B, 410C, and 410D) may be disposable and/or arbitrary vessels. For instance, embodiments may allow for a prescription liquid medicine bottle to be used as an auxiliary reservoir. Thus, parent or caregiver may directly attach a prescribed liquid medicine to the system 400B without the need for measuring or manually dispensing the medicine. Similarly, liquid nutrients or nutritional supplements may be packaged and used in a similar manner. Accordingly, a user may purchase a base formula cartridge and use the system 400B to prepare a variety of condition-specific infant formula preparations.

Figure 5:
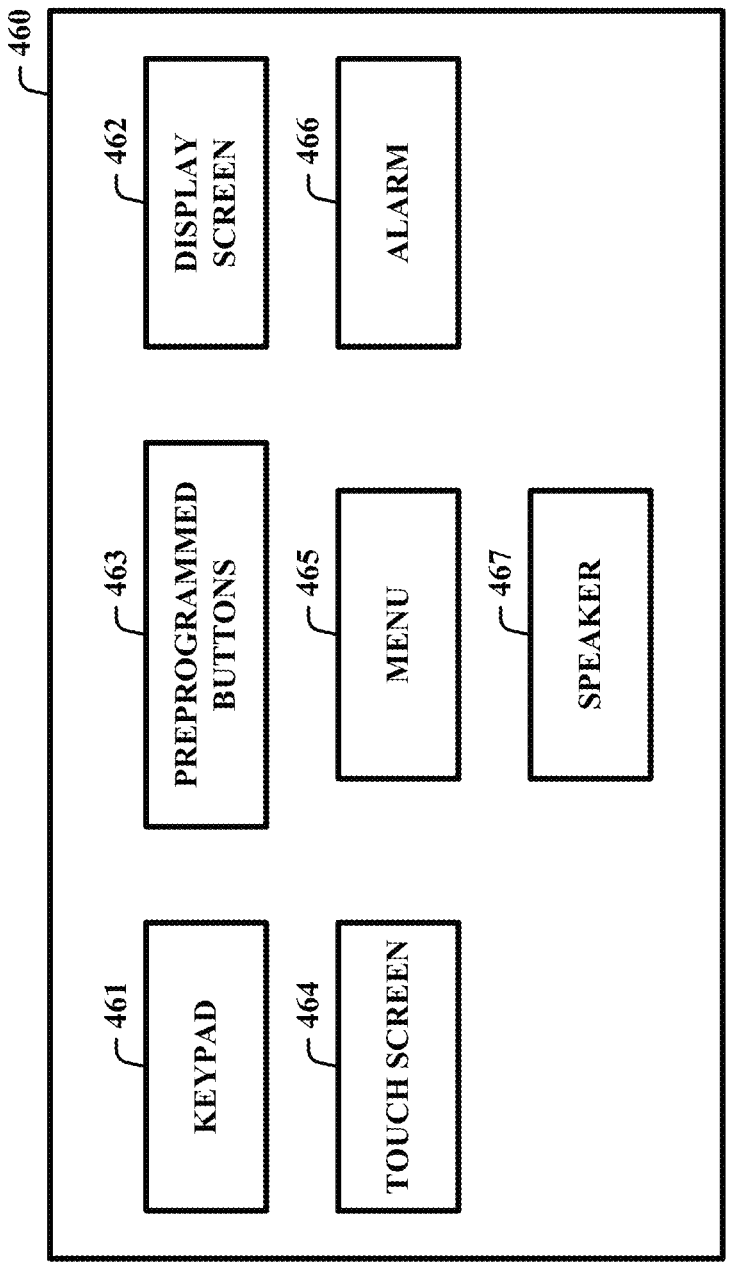
FIG. 5 is a schematic representation of an interface of an embodiment.

FIG. 5 is a schematic representation of an interface 460 of an embodiment. The interface 460 comprises a keypad 461, a display screen 462, preprogrammed buttons 463, a touch screen 464, menus 465, an alarm 466, and a speaker 467.

It will be apparent to those skilled in the art that the above methods and apparatuses may be changed or modified without departing from the general scope of the invention. The invention is intended to include all such modifications and alterations insofar as they come within the scope of the appended claims or the equivalents thereof.

Having thus described the invention, it is now claimed.

I claim:

1. An infant formula preparation system, comprising:
   a water source adapted to supply water to the system;
   a water line in fluid communication with the water source and adapted to convey water along a predetermined path;
   a component adapted to remove water contaminants from the water supplied to the system;
   a sensor adapted to detect a level of purity of the water supplied to the system;
   a water metering means in fluid communication with the water line and adapted to receive water from the water line, and dispense a metered amount of water through an output of the water metering means;
   a computer-controlled heater in thermal communication with the water line and adapted to maintain a volume of water within the water line at a predetermined temperature as temperature-controlled water;
   a water line in fluid communication with the output of the water metering means, the water line in fluid communication with the output of the water metering means adapted to pierce an infant formula cartridge and deliver the temperature-controlled water to the infant formula cartridge;
   at least one structural element adapted to receive the infant formula cartridge in a supported relation; and
   an effluent line in a fixed mechanical relation with the at least one structural element and adapted to pierce a bottom surface of the infant formula cartridge and allow dissolved or diluted infant formula to exit the infant formula cartridge.

2. The system of claim 1, wherein the water source comprises one or more of a reservoir or a household plumbing water source.

3. The system of claim 1, wherein the water metering means comprises a device selected from one or more of a metering valve or a pump.

4. The system of claim 3, wherein the pump is selected from one or more of a piston pump, a syringe pump, a peristaltic pump, or a diaphragm pump.

5. The system of claim 1, further comprising a computer processor in electronic controlling communication with the computer controlled heater, and the water metering means, wherein the computer processor is in electronic communication with a user interface adapted to supply instructions to the computer processor according to user selections.

6. The system of claim 5, further comprising a data port in electronic data communication with the computer processor and adapted to download data into the system and store the data in an onboard rewritable storage medium.

7. The system of claim 1, further comprising at least one auxiliary reservoir in metered fluid communication with the water line in fluid communication with the output of the water metering means.

8. The system of claim 7, wherein metered fluid communication between the at least one auxiliary reservoir and the water line in fluid communication with the output of the water metering means is achieved using a device comprising one or more of a piston pump, a syringe pump, a peristaltic pump, or a diaphragm pump.

* * * * *